(12) United States Patent
Imai et al.

(10) Patent No.: US 6,935,182 B2
(45) Date of Patent: Aug. 30, 2005

(54) PRESSURE SENSOR APPARATUS INCLUDING STEMS PROVIDED WITH STRAIN MEASURING ARRANGEMENT

(75) Inventors: Masahito Imai, Chita (JP); Makoto Hatanaka, Handa (JP)

(73) Assignee: Denso Corporation, Kariya (JP)

( * ) Notice: Subject to any disclaimer, the term of this patent is extended or adjusted under 35 U.S.C. 154(b) by 8 days.

(21) Appl. No.: 10/437,072

(22) Filed: May 14, 2003

(65) Prior Publication Data

US 2003/0230146 A1 Dec. 18, 2003

(30) Foreign Application Priority Data

Jun. 12, 2002 (JP) ..................................... 2002-171502

(51) Int. Cl.[7] ................................................ G01L 9/04
(52) U.S. Cl. ...................................................... 73/720
(58) Field of Search ...................... 73/715, 720, 719, 73/725, 726

(56) References Cited

U.S. PATENT DOCUMENTS 4,986,861 A * 1/1991 Nishida et al. ............... 73/726
5,866,822 A * 2/1999 Willig ......................... 73/719
6,312,061 B1 * 11/2001 Schliebe et al. ............. 73/756
6,732,590 B1 * 5/2004 Gottlieb et al. .............. 73/754

FOREIGN PATENT DOCUMENTS

| JP | A-S58-34772 | 7/1983 |
| JP | A-H04-270929 | 9/1992 |
| JP | H09-138173 | 5/1997 |
| WO | WO 00/30909 | 6/2000 |

* cited by examiner

*Primary Examiner*—Max Noori
(74) *Attorney, Agent, or Firm*—Posz Law Group, PLC

(57) ABSTRACT

A first end of each hollow stem includes a diaphragm and a strain gauge, and a second end of each stem includes an opening. A housing includes a plurality of stem receiving through holes, each of which receives the corresponding stem. An O-ring is arranged in each through hole such that the O-ring is placed adjacent an end surface of the second end of the stem, which is axially inwardly spaced from a surface of the side of the housing. When the stems and the housing are integrally installed over the device under test, each O-ring seals between the end surface of the second end of the corresponding stem and the device under test.

6 Claims, 7 Drawing Sheets

PRESSURE SENSOR APPARATUS INCLUDING STEMS PROVIDED WITH STRAIN MEASURING ARRANGEMENT

CROSS REFERENCE TO RELATED APPLICATION

This application is based on and incorporates herein by reference Japanese Patent Application No. 2002-171502 filed on Jun. 12, 2002.

BACKGROUND OF THE INVENTION

1. Field of the Invention

The present invention relates to a pressure sensor apparatus.

2. Description of Related Art

An example of previously proposed systems, which include a plurality of pressure sensors, is an electronic brake control system of a vehicle. Such a system needs a plurality of pressure sensors, each of which measures pressure, such as hydraulic brake pressure of each corresponding wheel.

In this case, as shown in FIG. 10, a plurality of sensor receiving through holes 200 is formed in the device K1 under test, such as an actuator of a brake system. Each pressure sensor 210 is received in a corresponding one of the sensor receiving through holes 200. Here, each pressure sensor 210 and an inner peripheral wall of the corresponding sensor receiving through hole 200 are secured to each other through a corresponding staking portion 220, which is formed by staking. Furthermore, an O-ring 230 seals between an outer peripheral surface of each pressure sensor 210 and an inner peripheral wall surface of the corresponding sensor receiving through hole 200.

Pressure is introduced into each pressure sensor 210 from a lower side in FIG. 10, and an electric signal, which corresponds to the measured pressure, is outputted from pins 240 of the pressure sensor 210.

However, in the previously proposed system, the pressure sensors 210 need to be directly individually installed to the device K1 under test. Thus, when one of the pressure sensors 210 malfunctions, the entire device K1 having the pressure sensors 210 installed thereto needs to be replaced. As described above, the device K1 under test is the expensive device, such as the above-described actuator, resulting in increased costs.

SUMMARY OF THE INVENTION

The present invention addresses the above disadvantage. Thus, it is an objective of the present invention to provide a pressure sensor apparatus, in which a plurality of pressure sensors is integrated to serve as an integrated unit to allow relatively easy installation of the pressure sensors to a device under test and also to allow relatively easy replacement of the pressure sensors.

To achieve the objective of the present invention, there is provided a pressure sensor apparatus for testing a device under test, the pressure sensor apparatus includes a plurality of hollow stems, a housing and a plurality of seal members. Each stem includes a diaphragm, a strain measuring arrangement and an opening. The diaphragm is arranged in a first end of the stem. The strain measuring arrangement is arranged in the first end of the stem to measure strain on the diaphragm. The opening is provided through an end surface of a second end of the stem, which is opposite to the first end, to introduce pressure to the diaphragm. The housing includes a plurality of stem receiving through holes, each of which extends through the housing from a first side of the housing to a second side of the housing that is opposite to the first side of the housing. Each stem receiving through hole receives a corresponding one of the plurality of stems. Each seal member is arranged in a corresponding one of the stem receiving through holes such that each seal member is placed adjacent the end surface of the second end of the corresponding stem. Each stem is received and is secured in the corresponding stem receiving through hole such that the first end of the stem, which includes the diaphragm, is exposed on the first side of the housing, and the second end of the stem, which includes the opening, is exposed on the second side of the housing. The end surface of the second end of each stem is received in the corresponding stem receiving through hole such that the end surface of the second end of the stem is axially inwardly spaced apart from a surface of the second side of the housing. When the plurality of stems and the housing are integrally installed over the device under test, each seal member seals between the end surface of the second end of the corresponding stem and the device under test.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

An embodiment of the present invention will be described with reference to the accompanying drawings.

With reference to FIGS. 1 to 4, a pressure sensor apparatus S1 according to the present embodiment is for an electronic brake control system of a vehicle and measures, for example, hydraulic brake pressure. The pressure sensor apparatus S1 includes a plate-like housing 10 molded from a metal material, a resin material or the like. In the present embodiment, the housing 10 is a die-cast housing fabricated by aluminum die-casting.

Figure 3:
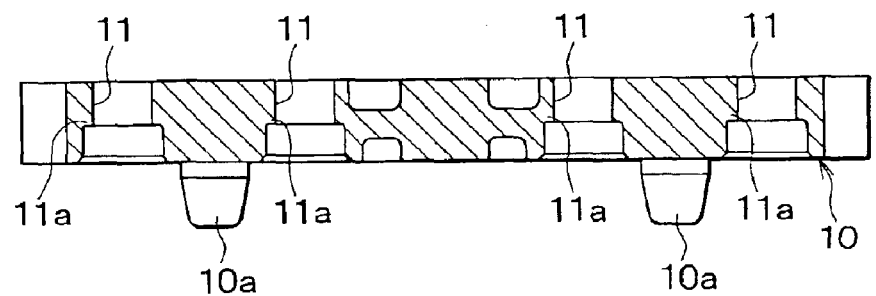
FIG. 3 is a cross sectional view of a housing of the pressure sensor apparatus of FIG. 1.
Figure 4:
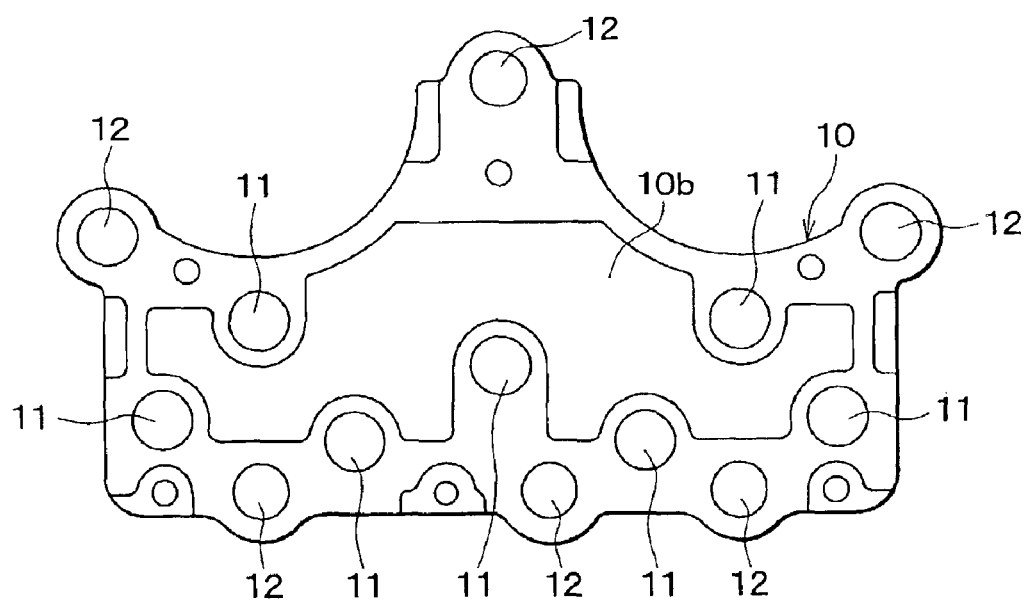
FIG. 4 is a plan view of FIG. 3.
Figure 5:
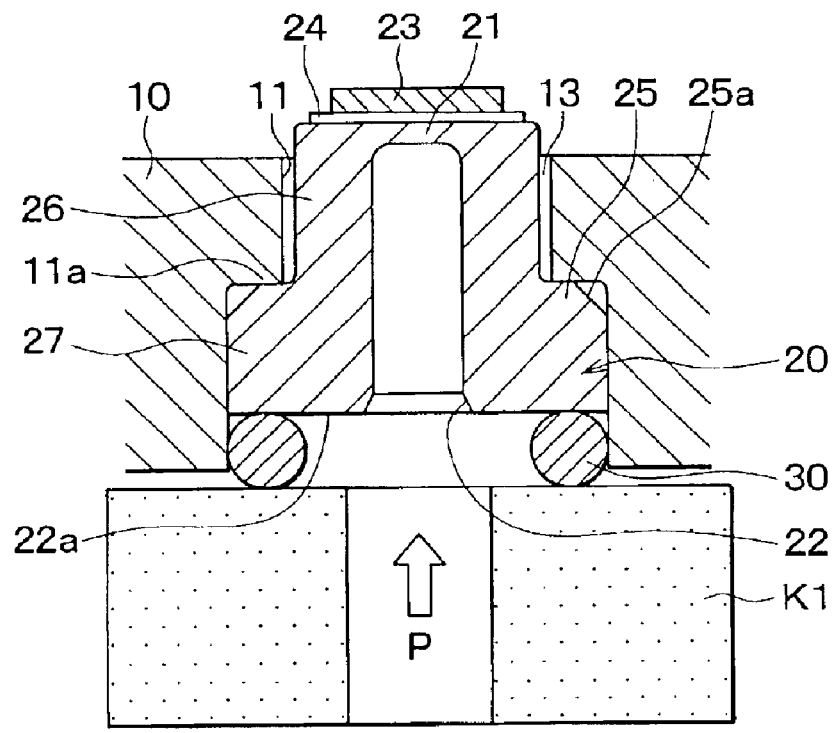
FIG. 5 is a partially enlarged cross sectional view showing a stem of the pressure sensor apparatus of FIG. 1.

As shown in FIGS. 3 and 4, the housing 10 includes a plurality of stem receiving through holes 11, which penetrate through the housing 10 from a first side (top side in FIG. 3) of the housing 10 to a second side (bottom side in FIG. 3), which is opposite to the first side. The housing 10 is installed over an actuator K1, which serves as a device under test, such that the second side of the housing 10 faces the device under test (FIG. 5).

A plurality of positioning pins 10a made of, for example, a resin material is formed in the second side of the housing 10. The positioning pins 10a are received in corresponding holes provided in the device under test. The housing 10 is secured to the actuator K1 by screws, each of which threadably engages a corresponding one of screw holes 12 formed in an outer peripheral region of the housing 10 and also threadably engages a corresponding one of screw holes formed in the actuator K1.

Figure 2:
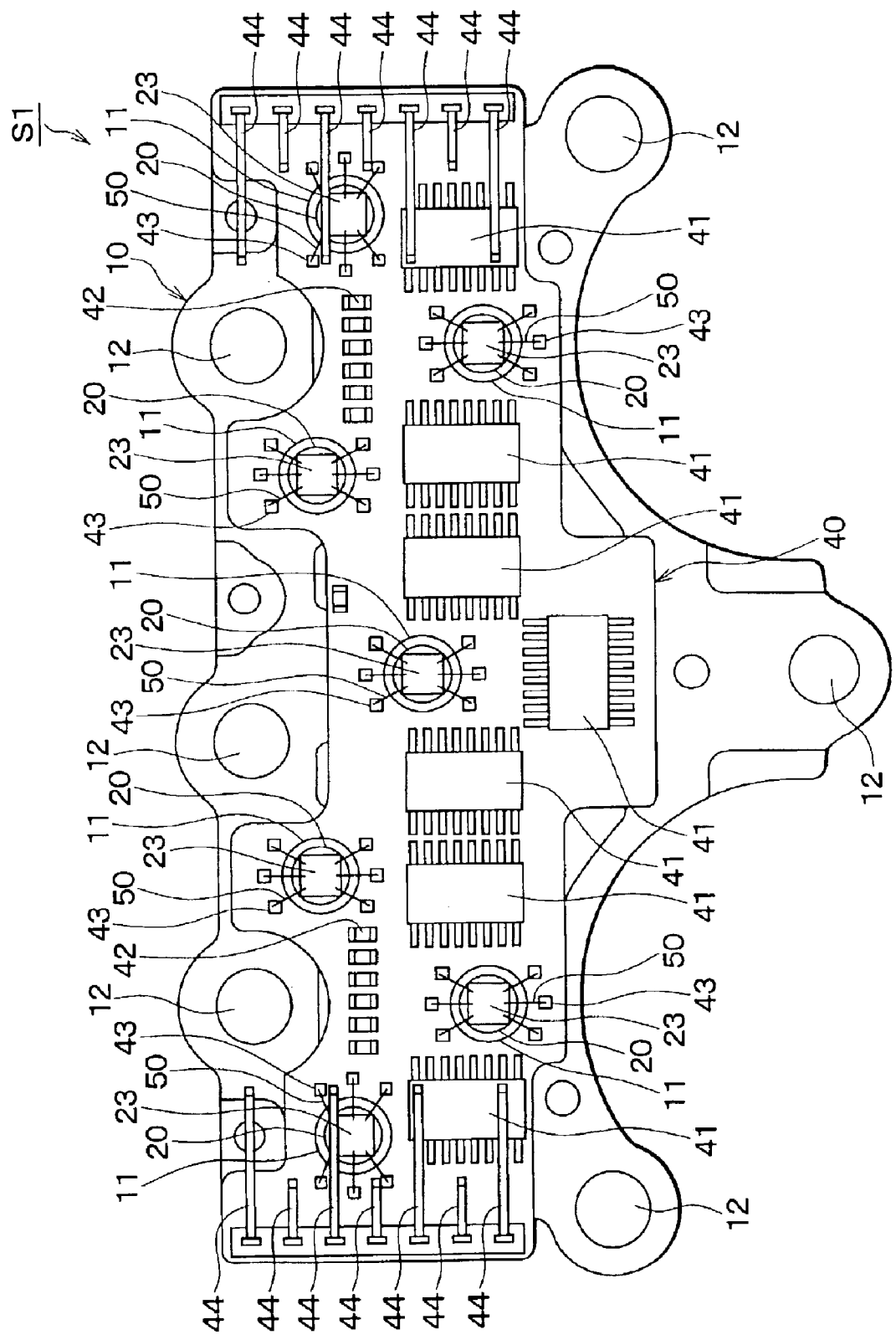
FIG. 2 is a plan view of the pressure sensor apparatus of FIG. 1 without a cover.

In the present embodiment, there are provided seven stem receiving through holes 11 in the housing 10. The stem receiving through holes 11 are staggered, as shown in FIGS. 2 and 4. Furthermore, as shown in FIG. 4, the housing 10 has a thin-walled section 10b, which is thinner than a thick-walled section that includes the rest of the housing 10, i.e., the outer peripheral region of the housing 10 and a peripheral region around each stem receiving through hole 11. For example, in the first side (top side in FIG. 3) of the housing 10, a height difference between the surface of the thin-walled section 10b and the surface of the thick-walled section is equal to or greater than about 2 mm.

Figure 6:
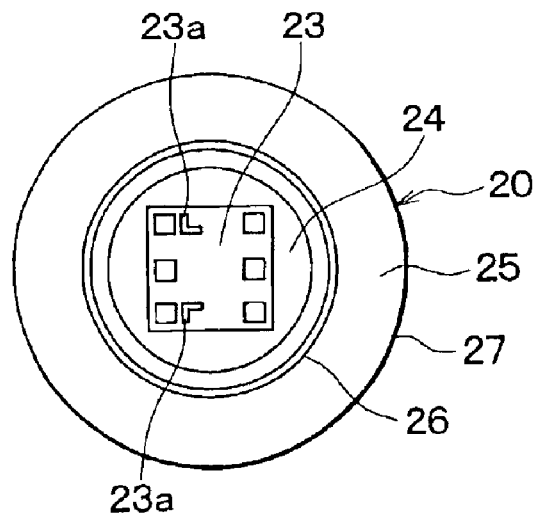
FIG. 6 is a plan view of FIG. 5.
Figure 7:
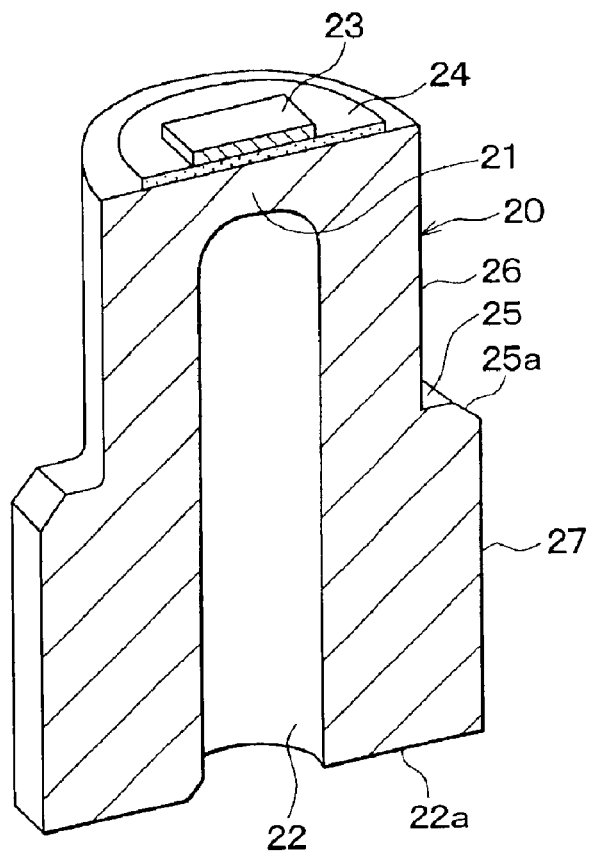
FIG. 7 is an enlarged perspective cross sectional view of the stem of FIG. 5.

A metal stem 20, which serves as a sensor, is inserted and is secured in each stem receiving through hole 11. FIG. 5 is an enlarged cross sectional view showing a longitudinal cross section of the stem 20. FIG. 6 is a view of the stem 20 seen from a diaphragm 21 side in FIG. 5, i.e., a plan view of the stem 20. FIG. 7 is a perspective cross sectional view of the stem 20, which is cut in half in the longitudinal direction.

As shown in FIGS. 5 to 7, the stem 20 is made as a hollow cylindrical body having a closed end at one end and an open end at the other end. A metal material of the stem 20 can include iron (Fe), nickel (Ni) and cobalt (Co) or alternatively iron (Fe) and nickel (Ni) as a main metal material and can additionally includes titanium (Ti), niobium (Nb) and aluminum (Al) or alternatively titanium (Ti) and niobium (Nb) as a reinforcing material that can participate in precipitation hardening and can be added to the main metal material depending on the required strength.

The stem 20 has the diaphragm 21 at a first end, i.e., the closed end side of the stem 20. The diaphragm 21 is strainable or deformable upon application of pressure to the diaphragm 21. The stem 20 has an opening 22 for introducing or conducting pressure to the diaphragm 21 at a second end of the stem 20, which is opposite to the first end of the stem 20. Furthermore, a sensor chip 23 is secured to a surface of the diaphragm 21 by a bonding material, such as a low-melting glass material. The sensor chip 23 is shaped as a rectangular plate and is made from a semiconductor substrate, such as a silicon substrate.

The sensor chip 23 is formed as a strain gauge or a strain measuring arrangement, through which strain of the diaphragm 21 upon straining of the diaphragm 21 is measured. For example, diffused resistors are formed on the silicon substrate, and a bridge circuit, such as a full-bridge circuit or a half-bridge circuit, is formed from the diffused resistors on the silicon substrate to output electric signals based on the strain of the diaphragm 21. As shown in FIG. 6, the sensor chip 23 includes visible marks 23a, which aid in angular positioning of the stem 20 about the axis of the stem 20.

Furthermore, as shown in FIG. 5, the diaphragm 21 of the stem 20 and the sensor chip 23 at the first end of the stem 20 protrude from the corresponding stem receiving through hole 11 and are exposed on the first side of the housing 10. Furthermore, the opening 22 side, i.e., the second end of the stem 20 is exposed on the second side of the housing 10. However, an end surface 22a of the second end of the stem 20, that is, a peripheral edge region 22a of the opening 22 is recessed or axially inwardly spaced from a surface of the second side of the housing 10 within the stem receiving through hole 11.

As described above, the cylindrical stem 20 is inserted into the stem receiving through hole 11 in an axial direction (longitudinal direction) of the stem 20. Furthermore, the stem 20 has a step 25 in an outer surface of the stem 20. A portion of the stem 20 located on the diaphragm 21 side (i.e., the first end side) of the step 25 is referred to as a small diameter section 26. Also, a portion of the stem 20 located on the opening 22 side (i.e., the second end side) of the step 25 is referred to as a large diameter section 27, which has an outer diameter larger than that of the small diameter section 26. Here, as shown in FIGS. 5 and 7, an outer peripheral region of the step 25 is chamfered to form a chamfered part 25a.

An inner peripheral surface of each stem receiving through hole 11 is stepped to correspond with the outer shape of the stem 20. That is, the stem receiving through hole 11 is formed as a stepped hole. The stem 20 is secured to the housing 10 through the large diameter section 27 of the stem 20, which is press fitted to the housing 10 in the corresponding stem receiving through hole 11. The installation of the stem 20 into the corresponding stem receiving through hole 11 is performed in a manner depicted in FIG. 8.

Figure 8:
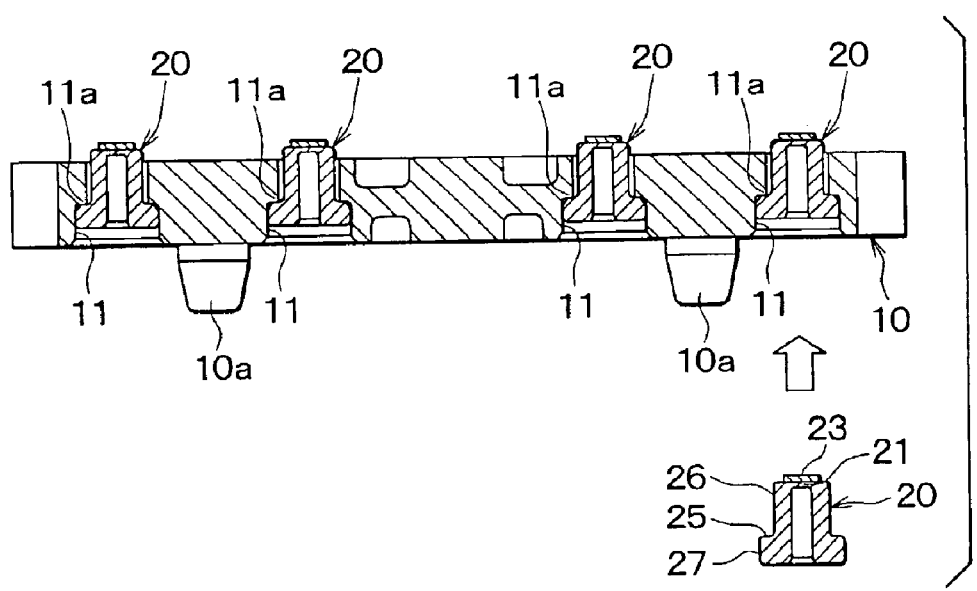
FIG. 8 is a cross sectional view showing installation of the stem into a corresponding stem receiving through hole of the housing.

That is, as shown in FIG. 8, the diaphragm 21 side of the stem 20 is inserted into the stem receiving through hole 11 from the second side of the housing 10. Then, when the step 25 of the stem 20 abuts against the step 11a of the stem receiving through hole 11, the stem 20 is positioned relative to the stem receiving through hole 11. A size of the step 25 in the stem 20 is selected such that a difference between the outer diameter of the small diameter section 26 and the outer diameter of the large diameter section 27 is equal to or greater than 1 mm.

Furthermore, as shown in FIG. 5, a gap 13 is defined between an outer peripheral surface of the diaphragm 21 side (first end) of each stem 20, i.e., an outer peripheral surface of the small diameter section 26 and the inner peripheral surface of the corresponding stem receiving through hole 11. The size of the gap 13 can be, for example, equal to or greater than 0.2 mm.

Furthermore, a seal member 30 is arranged in each stem receiving through hole 11 in contact with the end surface 22a of the second end (opening 22 side) of the stem 20. The seal member 30 can be one that is resilient and shows effective sealing performance. In the present instance, an O-ring 30 is used as the seal member 30.

As shown in FIG. 5, when the housing 10 and the stems 20 are placed over the device K1 under test, each O-ring 30 seals between the device K1 under test and the end surface 22a at the second end of the stem 20. In this way, the pressure P from the device K under test is appropriately applied to the backside of the diaphragm 21 through the opening 22 of the stem 20 without substantial leakage.

Figure 1:
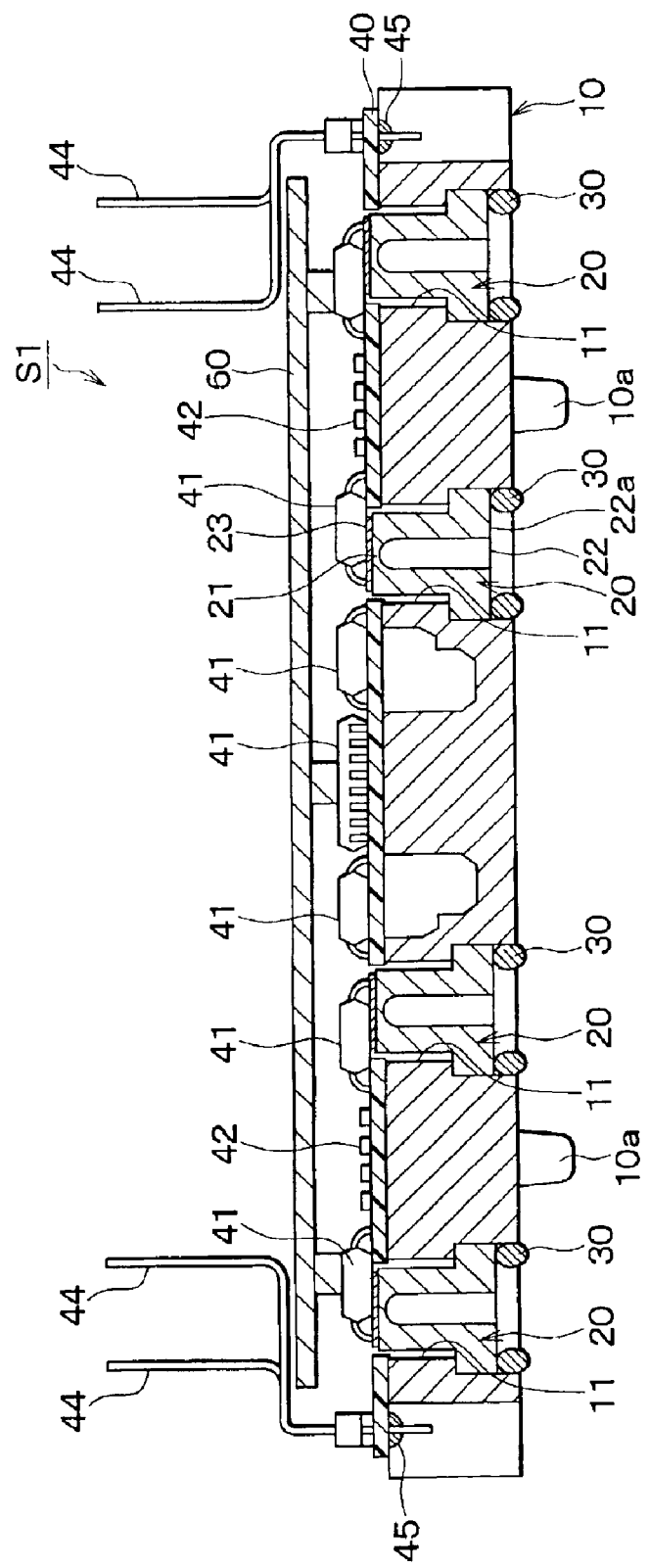
FIG. 1 is a schematic cross sectional view of a pressure sensor apparatus according to a first embodiment of the present invention.

Furthermore, as shown in FIGS. 1 and 2, a circuit board (in the present instance, this is a printed circuit board) 40 is secured to the first side of the housing 10. The circuit board 40 processes output signals from the sensor chip 23 of each stem 20 by, for example, amplifying or adjusting the output signals.

IC packages 41 and capacitors 42 are arranged in the circuit board 40. As shown in FIG. 2, the sensor chip 23 of each stem 20 is connected to corresponding pads 43 of the circuit board 40 by wires 50 provided through, for example, wire bonding. In FIG. 1, the wires 50 are eliminated for the sake of simplicity.

Here, the circuit board 40 and the housing 10 are secured to each other by the bonding material. It is preferred that the bonding material is always placed underneath the respective pads 43 of the circuit board 40. This is performed to sufficiently secure the pads 43 of the circuit board 40 and thereby to ensure conduction of ultrasonic energy to the wires 50 at the time of wire bonding.

Furthermore, the bonding material for securing between the circuit board 40 and the housing 10 could flow into the gap 13 between the outer peripheral surface of each stem 20 and the inner peripheral surface of the corresponding stem receiving through hole 11. When the bonding material flows into the gap 13 and has relatively high Young's modulus, there is a high possibility of generating a non-negligible stress on the diaphragm 21. Therefore, the Young's modulus of the above bonding material is preferably equal to or less than 100 MPa.

Also, as shown in FIG. 2, lead pins 44, which make external electrical connections, are electrically and mechanically connected to corresponding parts in an outer peripheral of the circuit board 40 by, for example, solder 45. In this way, electrical signals from the sensor chip 23 are processed in the circuit board 40 and are outputted from the circuit board 40 through the lead pins 44.

Figure 9:
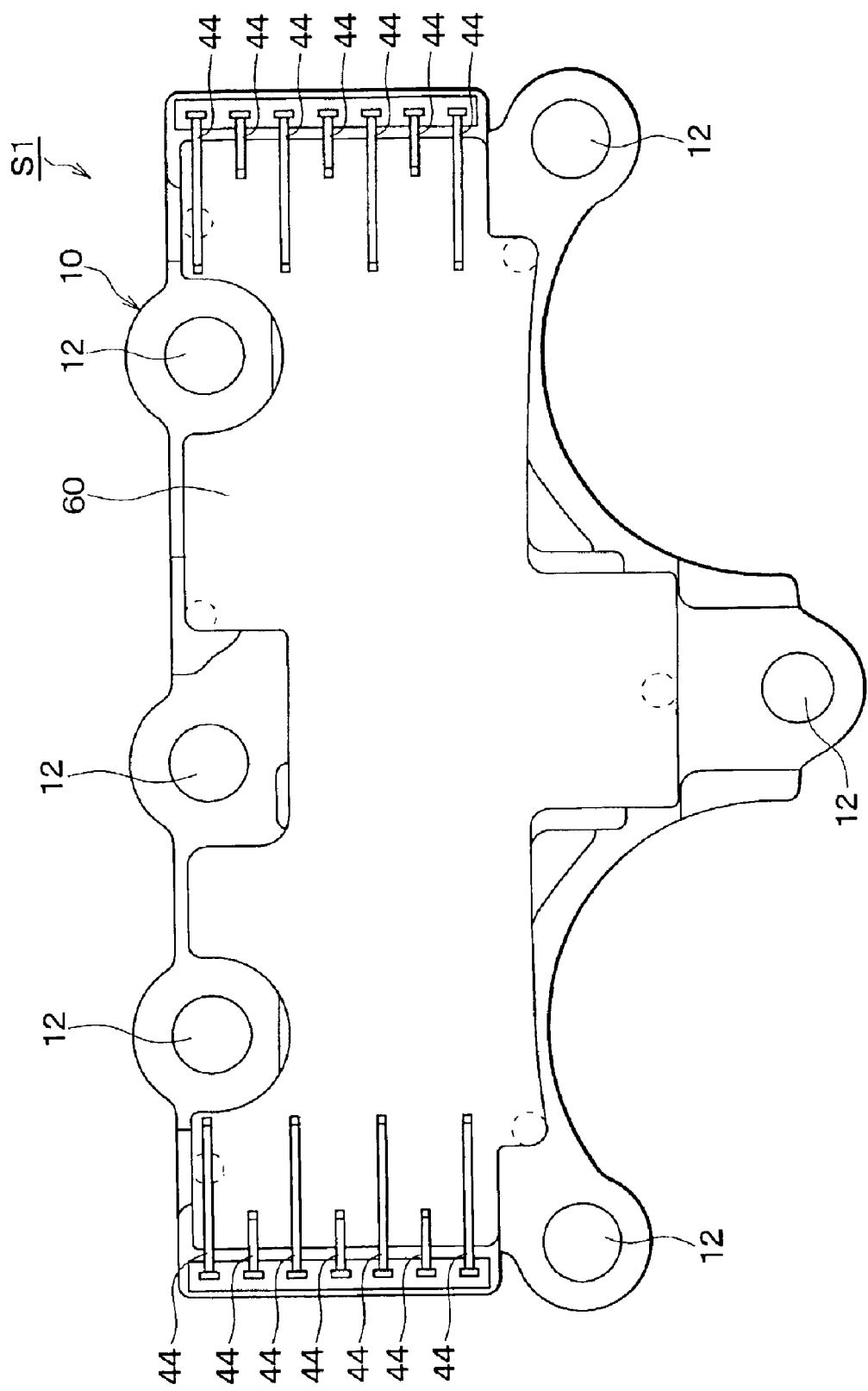
FIG. 9 is a schematic plan view of the pressure sensor apparatus of FIG. 1 with the cover installed thereto.
Figure 10:
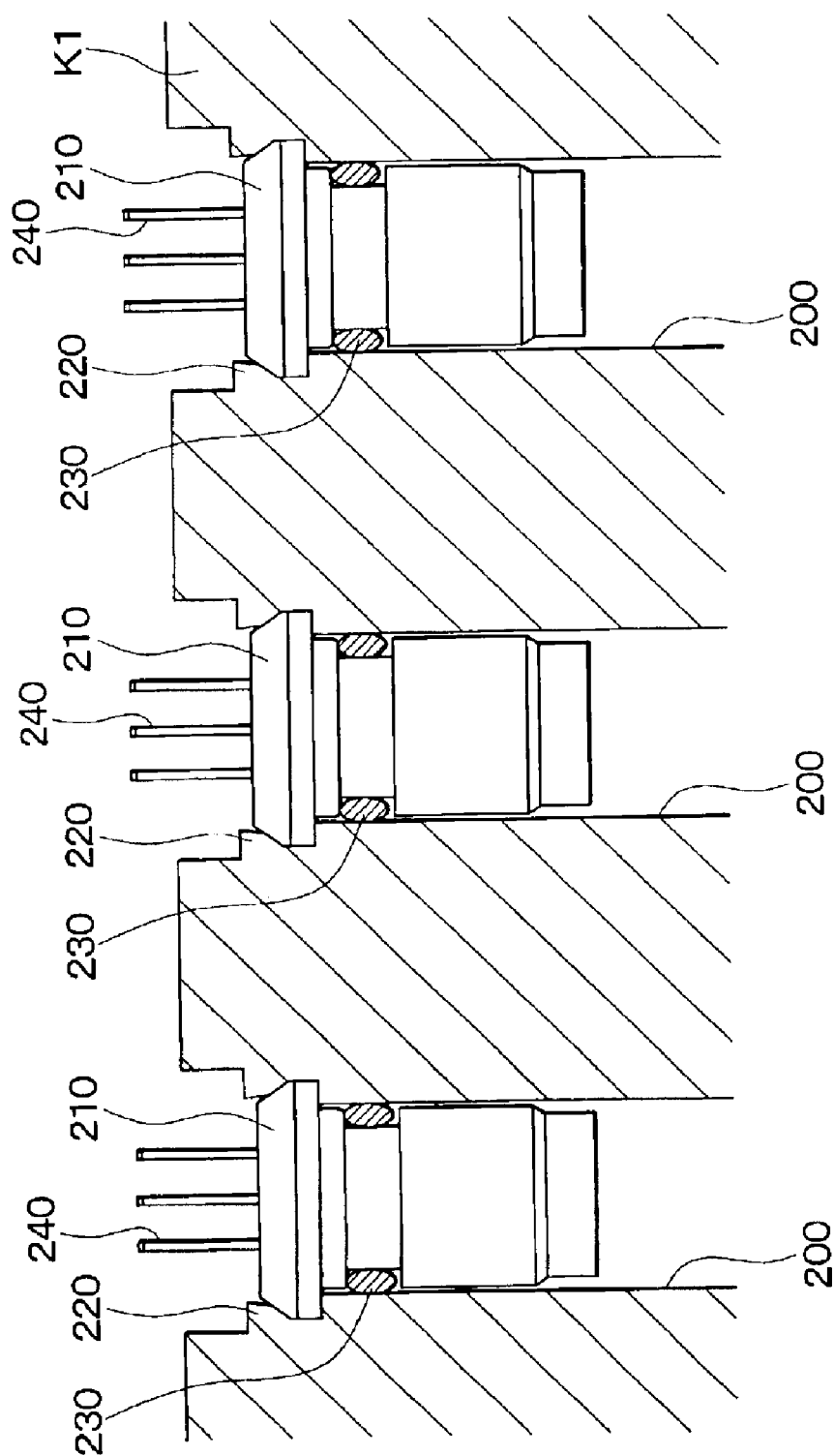
FIG. 10 is a schematic cross sectional view showing previously proposed pressure sensors installed in a device under test.

Furthermore, as shown in FIG. 1, the surface of the circuit board 40 is covered with the cover 60 made of, for example, a resin material, such as polybutylene terephthalate (PBT), so that the cover 60 mechanically protects the circuit board 40. The cover 60 is secured to the housing 10 by, for example, press fitting or bonding. FIG. 9 is a schematic plan view showing the housing 10 covered with the cover 60.

Each lead pin 44 is arranged adjacent the cover 60 such that the lead pin 44 is bent at its middle and are placed over the cover 60 in a manner shown in FIGS. 1 and 9. In this way, when the lead pin 44 is urged downward in FIG. 1 and is bent by the urging force applied downward from the top side in FIG. 1, the lead pin 44 engages the cover 60 and is supported by the cover 60. Thus, excessive deformation of the lead pin 44 is prevented, and a damage to the soldered connection of the lead pin 44 can be prevented.

The pressure sensor apparatus S1 is manufactured, for example, in the following manner. A bonding material 24 made of, for example, low-temperature glass, is printed over the top, i.e., the first end of the hollow cylindrical stem 20 made, for example, by cutting or press working operation. Then, the bonding material 24 is sintered. Thereafter, the sensor chip 23 made in, for example, a semiconductor manufacturing process is secured to the top of the bonding material 24 and is sintered, so that the sensor chip 23 is secured to the stem 20.

Next, as shown in FIG. 8, each stem 20 is press fitted into the corresponding stem receiving through hole 11 of the housing 10 fabricated by aluminum die-casting, so that the stem 20 is secured to the corresponding stem receiving through hole 11. At this time, the angular positioning of the stem 20 about the axis of the stem 20 is performed while checking the marks 23a of the sensor chip 23 shown in FIG. 6 through use of image recognition technique. In this way, accurate wire bonding is made possible.

Next, the circuit board 40 is secured to the housing 10 by, for example, bonding. Thereafter, each sensor chip 23 and the corresponding pads 43 of the circuit board 40 are wire bonded. Then, on the circuit board 40, gel (not shown) is applied to and is solidified at connections of the IC packages 41 and connections of the wires 50 to protect these connections.

Then, the cover 60 is assembled, and the lead pins 44 are soldered to the circuit board 40. In this way, the manufacturing of the pressure sensor apparatus S1 is completed.

In the present embodiment, each stem 20 functions as the single sensor, in which the pressure is received by the diaphragm 21 through the opening 22 and is sensed by the sensor chip 23 that serves as the strain gauge (strain measuring arrangement). The stems 20 are integrated, i.e., are packaged by the housing 10, so that the stems 20 can be integrally installed to the device K1 under test via the housing 10.

With this arrangement, for example, when one of the stems 20 malfunctions, the housing 10 is removed from the device K1 under test, and the malfunctioning stem 20 is replaced with a new stem 20. In this way, unlike the previously proposed art, replacement of the entire device K under test is not required.

Furthermore, in the case where the sensors are simply individually installed to the housing, each sealing arrangement becomes disadvantageously complicated. However, in the present embodiment, the O-ring (seal member) 30 is arranged between each stem 20 and the device K1 under test to achieve the effective sealing performance. That is, although the pressure from the device K1 under test is introduced through the opening 22 of each stem 20, this pressure inlet or opening is sealed by the O-ring 30, so that the leakage of the pressure is substantially prevented.

Furthermore, the end surface 22a of the second end of each stem 20 is arranged at the position that is axially inwardly recessed or spaced apart from the surface of the second side of the housing 10, so that the space between the end surface 22a of second end of the stem 20 and the surface of the second side of the housing 10 is available for accommodating the O-ring 30. Therefore, the O-ring 30 can be held in the stem receiving through hole 11, so that the O-ring 30 can be relatively easily handled.

In addition, since each O-ring 30 is held in the pressure sensor apparatus S1, more specifically, in the housing 10, there is no need to provide a groove or the like to hold the O-ring 30 in the device K1 under test.

Also, each sealing surface of the pressure sensor apparatus S1 is the end surface 22a of the second end of the stem 20, which is arranged at the position that is axially inwardly recessed from the surface of the second side of the housing 10. Therefore, a damage to the sealing surface 22a can be restrained, and the provision of the sealing surface in the housing 10 is not required. As a result, limitations on the material of the housing 10 and limitations on the manufacturing of the housing 10 can be alleviated.

In this way, in the pressure sensor apparatus S1, the pressure sensors, i.e., the stems 20 are integrated as the single unit, and the above advantages are achieved. Therefore, according to the present embodiment, there is provided the pressure sensor apparatus, in which the stems 20 are integrated as the single unit to allow easy installation of the stems 20 into the device K1 under test.

Furthermore, according to the present embodiment, the gap 13 is formed between the outer peripheral surface of the small diameter section 26 of each stem 20 and the inner peripheral surface of the corresponding stem receiving through hole 11. The diaphragm 21 and the sensor chip 23 (serving as the strain gauge or strain measuring arrangement) form the sensing portion of the stem 20 and determine the sensor characteristics of stem 20.

In the present embodiment, the sensing portion of each stem 20 and the housing 10 are not in contact with each other, so that it is possible to limit application of the stress, which is induced by, for example, a difference in thermal expansion coefficient between the stem 20 and the housing 10, to the sensing portion. As a result, good sensor characteristics can be achieved.

Also, as described above, when the stem 20 is press fitted into the corresponding stem receiving through hole 11, the step 25 of the stem 20 and the opposed step 11a of the stem receiving through hole 11 engage with each other to stop further axial movement of the stem 20, so that the stem 20 is axially positioned there. During the press fitting of the stem 20, the stem 20 could scrape or cut a part of the housing 10, and the scraped debris could be held between the step 25 of the stem 20 and the opposed step 11a of the stem receiving through hole 11, so that the axial position of the stem 20 could be varied due to the thickness of the scraped debris.

In the present embodiment, however, the outer peripheral region of the step 25 of the stem 20 is chamfered, so that the accommodating space, which accommodates the scraped debris, is provided between the stem receiving through hole 11 and the chamfered part 25a of the stem 10. This accommodating space is advantageous in the positioning of the stem 20 in the stem receiving through hole 11.

In the present embodiment, it should be understood that the housing 10 can be one that is fabricated by die-casting. As described above, since the sealing surface is provided in each stem 20, the housing 10 does not need to have the sealing surface. That is, limitations of flatness, air tightness and/or the like of the housing 10, which exist when the corresponding sealing surface is provided in the housing 10, no longer exist according to the present embodiment. Thus, the housing 10 can be fabricated by the die-casting process, which is considered as the relatively low cost process.

Furthermore, as described above, the housing 10 has the thin-walled section 10b, which is thinner than the thick-walled section that includes the rest of the housing 10, i.e., the outer peripheral region of the housing 10 and the peripheral region around each stem receiving through hole 11. If the housing 10 is formed as the one that has a generally uniform thickness throughout the housing 10, the housing 10 tends to be warped. However, according to the present embodiment, there is provided the housing 10, in which such warping of the housing 10 is restrained, and the strength of the housing 10 is improved. Furthermore, only the section of the housing 10, which requires extra thickness, is thickened, and the rest of the housing 10 is thinned to reduce the weight of the housing 10.

Furthermore, according to the present embodiment, the stem receiving through holes 11 are staggered, so that the stem receiving through holes 11 are effectively arranged within the limited space of the housing 10. This arrangement is advantageous for reducing the size of the pressure sensor arrangement S1.

Additional advantages and modifications will readily occur to those skilled in the art. The invention in its broader terms is therefore not limited to the specific details, representative apparatus, and illustrative examples shown and described.

What is claimed is:

1. A pressure sensor apparatus for testing a device under test, the pressure sensor apparatus comprising:
    a plurality of hollow stems, each of which includes:
        a diaphragm that is arranged in a first end of the stem;
        a strain measuring arrangement that is arranged in the first end of the stem to measure strain on the diaphragm; and
        an opening that is provided through an end surface of a second end of the stem, which is opposite to the first end, to introduce pressure to the diaphragm;
    a housing that includes a plurality of stem receiving through holes, each of which extends through the housing from a first side of the housing to a second side of the housing that is opposite to the first side of the housing, wherein each stem receiving through hole receives a corresponding one of the plurality of stems; and
    a plurality of seal members, each of which is arranged in a corresponding one of the stem receiving through holes such that each seal member is placed adjacent the end surface of the second end of the corresponding stem, wherein:
    each stem is received and is detachably secured in the corresponding stem receiving through hole such that the first end of the stem, which includes the diaphragm, is exposed on the first side of the housing, and the second end of the stem, which includes the opening, is exposed on the second side of the housing;
    the end surface of the second end of each stem is received in the corresponding stem receiving through hole such that the end surface of the second end of the stem is axially inwardly spaced apart from a surface of the second side of the housing; and
    when the plurality of stems and the housing are integrally installed over the device under test, each seal member seals between the end surface of the second end of the corresponding stem and the device under test.

2. A pressure sensor apparatus according to claim 1, wherein a gap is defined between an outer peripheral surface of the first end of each stem and an inner peripheral surface of the corresponding stem receiving through hole.

3. A pressure sensor apparatus according to claim 1, wherein:
    each stem includes:
        a small diameter section that includes the first end of the stem;
        a large diameter section that has an outer diameter larger than that of the small diameter section and includes the second end of the stem; and
        a step that is located between the small diameter section and the large diameter section;
    each stem receiving through hole is stepped to correspond with an outer shape of the corresponding stem;
    each stem is press fitted and is secured to the housing through the large diameter section of the stem within the corresponding stem receiving through hole; and
    an outer peripheral region of the step of each stem is chamfered.

4. A pressure sensor apparatus according to claim 1, wherein the housing is a die-cast housing fabricated by die-casting.

5. A pressure sensor apparatus according to claim 1, wherein the housing has a thin-walled section, which is thinner than the rest of the housing that includes an outer peripheral region of the housing and a peripheral region around each stem receiving through hole.

6. A pressure sensor apparatus according to claim 1, wherein the stem receiving through holes are staggered.

* * * * *